(12) United States Patent
Guo et al.

(10) Patent No.: US 10,895,281 B2
(45) Date of Patent: Jan. 19, 2021

(54) CURVED GROOVE BALL BEARING WITHOUT RETAINER

(71) Applicant: Northwest A&F University, Shaanxi (CN)

(72) Inventors: Kangquan Guo, Shaanxi (CN); Yaohua Hu, Shaanxi (CN); Wenjing Zhang, Shaanxi (CN); Fang Gu, Shaanxi (CN); Mingfang Wu, Shaanxi (CN)

(73) Assignee: Northwest A&F University, Xianyang (CN)

( * ) Notice: Subject to any disclaimer, the term of this patent is extended or adjusted under 35 U.S.C. 154(b) by 0 days.

(21) Appl. No.: 16/729,403

(22) Filed: Dec. 29, 2019

(65) Prior Publication Data

US 2020/0224715 A1    Jul. 16, 2020

(30) Foreign Application Priority Data

Jan. 10, 2019   (CN) .......................... 2019 1 0024162

(51) Int. Cl.
| | | |
|---|---|---|
| *F16C 31/04* | (2006.01) | |
| *F16C 19/06* | (2006.01) | |
| *F16C 33/58* | (2006.01) | |

(52) U.S. Cl.
CPC .............. *F16C 19/06* (2013.01); *F16C 31/04* (2013.01); *F16C 33/585* (2013.01)

(58) Field of Classification Search
CPC .......... F16C 19/06; F16C 19/50; F16C 31/04; F16C 2300/28
See application file for complete search history.

(56) References Cited

U.S. PATENT DOCUMENTS

2016/0123395 A1* 5/2016 Guo ........................ F16C 19/50
384/516

FOREIGN PATENT DOCUMENTS

| CN | 103438104 A | 12/2013 |
|---|---|---|
| CN | 104454968 A | 3/2015 |
| CN | 204704264 U | 10/2015 |

\* cited by examiner

*Primary Examiner* — Phillip A Johnson
(74) *Attorney, Agent, or Firm* — Wayne & Ken, LLC; Tony Hom

(57) ABSTRACT

The invention relates to universal machine parts, and more particularly to a curved groove ball bearing without a retainer, which can solve the problems in the prior at such as high pendulating frequency and small amplitude. For the bearing, an inner ring and an outer ring are respectively provided with a first curved groove and a second curved groove, where "peaks" and "valleys" of the first curved groove are respectively the same as those of the second curved groove in number. The second curved groove is filled with steel balls, and a retainer for fixing the relative positions of the steel balls is removed, increasing the amplitude and reducing the pendulating frequency.

2 Claims, 3 Drawing Sheets

CURVED GROOVE BALL BEARING WITHOUT RETAINER

CROSS-REFERENCE TO RELATED APPLICATIONS

This application claims the benefit of priority from Chinese Patent Application No. 201910024162.1, filed on Jan. 10, 2019. The content of the aforementioned application, including any intervening amendments thereto, is incorporated herein by reference in its entirety.

TECHNICAL FIELD

This application relates to universal machine parts, particularly to a ball bearing, and more particularly to a curved groove ball bearing without a retainer.

BACKGROUND OF THE INVENTION

Bearing is generally used to position shaft parts to allow them to rotate flexibly without any axial displacement. However, for a mechanism that is required to perform an axial displacement while rotating, the employment of a universal bearing will make the mechanism very complicated in structure. To simplify the mechanical structure of a squeezing-rubbing roller and simply change a rotary motion into a reciprocating linear motion, Chinese Patent No. 103438104B discloses a curved groove ball bearing, in which the original linear grooves on outer and inner rings of a bearing are replaced with perfectly symmetrical curved grooves to achieve the reciprocating linear motion while the shaft rotates, but there is high requirements for the pairing installation. Another Chinese Patent No. 204704264U discloses an angular contact curved groove ball bearing, which is installed in pairs to achieve the reciprocating motion and simplify the processing of the curved groove. The above-mentioned curved groove ball bearings both have a shortcoming of high pendulating frequency and small amplitude. Therefore, the invention provides a curved groove ball bearing without a retainer, which has a large amplitude and a low pendulating frequency, to overcome the defects in the prior art.

SUMMARY OF THE INVENTION

The invention is implemented via the following technical solutions. An inner ring and an outer ring are respectively provided with a first curved groove and a second curved groove, where "peaks" and "valleys" on the first curved groove are respectively the same as those on the second curved groove in number. The first and second curved grooves are both filled with steel balls, and a retainer for maintaining the relative positions of the steel balls is removed, such that the number of the steel balls can be improved and the number of "peaks" and "valleys" can be reduced, increasing the amplitude.

Specifically, the invention provides a curved groove ball bearing without a retainer, comprising: an outer ring, a plurality of steel balls and an inner ring;

wherein:

the outer ring and the inner ring respectively has a first curved groove and a second curved groove, the outer ring has a first wall and a second wall, the inner ring has a third wall and a forth wall; wherein the first wall of the outer ring is thicker than the second wall of the outer ring, and the third wall of the inner ring is thicker than the forth wall of the inner ring;

a plurality of "peaks" and "valleys" are formed on the outer ring along a center line of the first curved groove and pendulate along an axis of the bearing, and a plurality of "peaks" and "valleys" respectively corresponding to the number of the "peaks" and "valleys" of the outer ring are formed on the inner ring;

curved surfaces of the outer ring and the inner ring respectively contacting the steel balls are symmetrical with respect to a center line formed by centers of the steel balls;

a thickness of the forth wall of the inner ring is equal to or smaller than a radius of each of the steel balls; a thickness of the third wall of the inner ring is equal to or smaller than a diameter of each of steel balls;

the second wall of the outer ring is tangent to an arc of the second curved groove; a distance between tops of adjacent peaks in an axial direction is larger than a sum of an amplitude of the inner ring in the axial direction and the diameter of each of the steel balls; and a thickness of the first wall of the outer ring is equal to or smaller than a minimum distance from a center of each of the steel balls to an outer circumferential surface of the outer ring; and a distance between bottoms of adjacent valleys is larger than the sum of the amplitude of the inner ring in the axial direction and the diameter of each of the steel balls.

In an embodiment, a length of a center line of the first and second curved grooves is a positive integral multiple of the diameter of each of the steel balls.

The invention has the following beneficial effects.

(1) The invention is capable of changing a rotary motion into a linear motion.

(2) The invention has a small pendulating frequency and a large pendulating amplitude.

(3) The invention has a simple structure.

Figure 1:
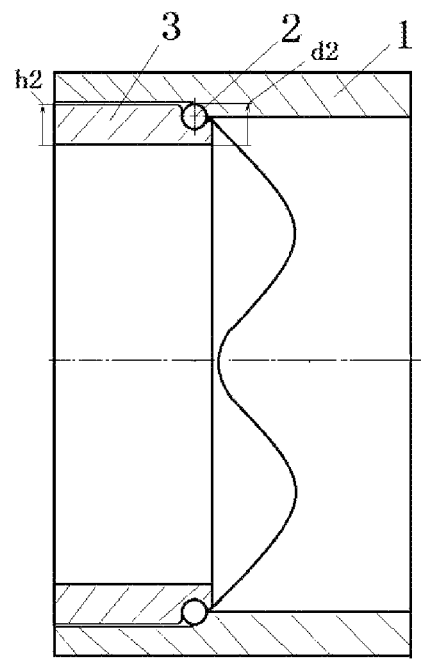
FIG. 1 is a schematic diagram of a curved groove ball bearing without a retainer according to an embodiment of the invention when an inner ring moves to the left, i.e., a "peak".
Figure 2:
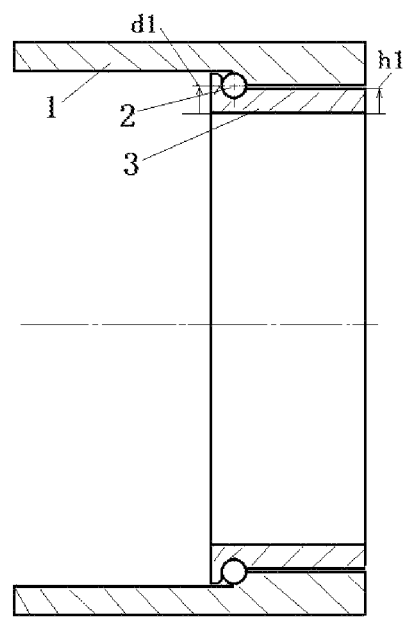
FIG. 2 is a schematic diagram of the curved groove ball bearing without a retainer according to an embodiment of the invention when the inner ring moves to the right, i.e., a "valley".
Figure 3:
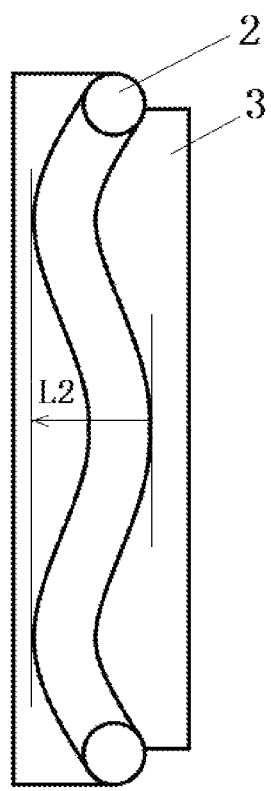
FIG. 3 schematically shows a relative position of the inner ring and steel balls according to an embodiment of the invention.
Figure 4:
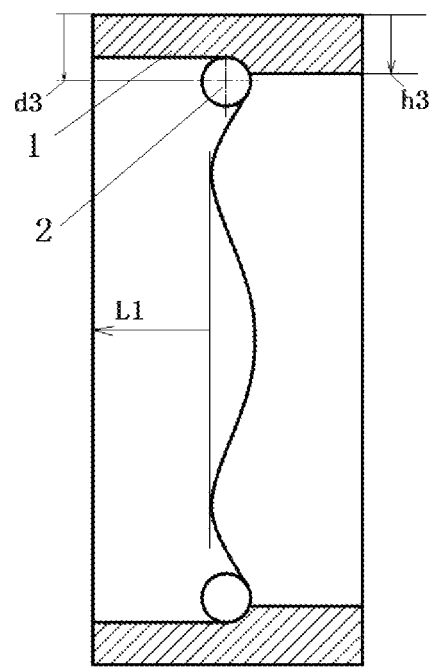
FIG. 4 schematically shows a relative position of an outer ring and the steel balls according to an embodiment of the invention.
Figure 5:
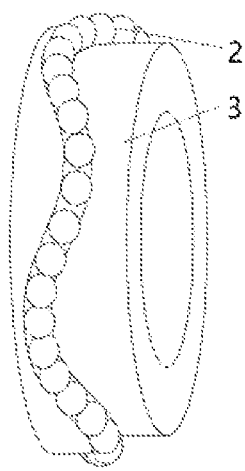
FIG. 5 is a schematic diagram of the outer ring after provided with the steel balls.
Figure 6:
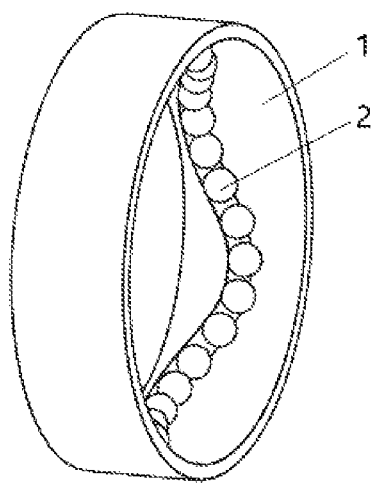
FIG. 6 is a schematic diagram of the inner ring after provided with the steel balls.

In the drawings, 1—outer ring; 2—steel balls; and 3—inner ring.

DETAILED DESCRIPTION OF EMBODIMENTS

The invention will be described in detail below with reference to the drawings and embodiments.

Example 1

Two curved grooves with 4 "peaks" and 4 "valleys" are provided respectively on an outer ring 1 and an outer ring 3.

Curved surfaces of the outer ring 1 and the inner ring 3 both have an amplitude of 5 mm. The curved groove of the inner ring 3 can be just filled with 24 steel balls. The outer ring 1 and the inner ring 3 both pendulate 4 times while undergoing a rotation for one circle.

Example 2

Two curved grooves with 2 "peaks" and 2 "valleys" are provided respectively on an outer ring 1 and an outer ring 3. Curved surfaces of the outer ring 1 and the inner ring 3 both have an amplitude of 25 mm. The outer ring 1 and the inner ring 3 both pendulate 2 times while undergoing a rotation for one circle.

Based on the above principles, various embodiments can be made through the changes in structure and parameters, and these embodiments should fall within the scope of the invention.

What is claimed is:

1. A curved groove ball bearing without a retainer, comprising:
   an outer ring,
   a plurality of steel balls, and
   an inner ring;
   wherein:
   the outer ring and the inner ring respectively has a first curved groove and a second curved groove, the outer ring has a first wall and a second wall, the inner ring has a third wall and a fourth wall; wherein the first wall of the outer ring is thicker than the second wall of the outer ring, and the third wall of the inner ring is thicker than the fourth wall of the inner ring;
   a plurality of peaks and valleys are formed on the outer ring along a center line of the first curved groove and pendulate along an axis of the bearing, and a plurality of peaks and valleys respectively corresponding to the number of the plurality of peaks and valleys of the outer ring are formed on the inner ring;
   curved surfaces of the outer ring and the inner ring respectively contacting the steel balls are symmetrical with respect to a center line formed by centers of the steel balls;
   a thickness of the fourth wall of the inner ring is equal to or smaller than a radius of each of the steel balls; a thickness of the third wall of the inner ring is equal to or smaller than a diameter of respective steel balls;
   the second wall of the outer ring is tangent to an arc of the second curved groove; a distance between tops of adjacent peaks in an axial direction is larger than a sum of an amplitude of the inner ring in the axial direction and the diameter of each of the steel balls; and
   a thickness of the first wall of the outer ring is equal to or smaller than a minimum distance from a center of each of the steel balls to an outer circumferential surface of the outer ring; and a distance between bottoms of adjacent valleys is larger than the sum of the amplitude of the inner ring in the axial direction and the diameter of each of the steel balls.

2. The curved groove ball bearing of claim 1, wherein a length of a center line of the first and second curved grooves is a positive integral multiple of the diameter of each of the steel balls.

* * * * *